(12) United States Patent
Benedict et al.

(10) Patent No.: US 11,932,428 B2
(45) Date of Patent: Mar. 19, 2024

(54) ROTARY-WING, HOVER-CAPABLE AIRCRAFT AND METHODS

(71) Applicant: The Texas A&M University System, College Station, TX (US)

(72) Inventors: Moble Benedict, College Station, TX (US); Hunter J. Denton, Hawkins, TX (US); Hao Kang, Abingdon, MD (US); Vikram Hrishikeshavan, Arlington, VA (US)

(73) Assignee: The Texas A&M University System, College Station, TX (US)

( * ) Notice: Subject to any disclaimer, the term of this patent is extended or adjusted under 35 U.S.C. 154(b) by 118 days.

(21) Appl. No.: 17/613,882

(22) PCT Filed: May 22, 2020

(86) PCT No.: PCT/US2020/034396
§ 371 (c)(1),
(2) Date: Nov. 23, 2021

(87) PCT Pub. No.: WO2020/247198
PCT Pub. Date: Dec. 10, 2020

(65) Prior Publication Data
US 2022/0219814 A1 Jul. 14, 2022

Related U.S. Application Data (60) Provisional application No. 62/852,906, filed on May 24, 2019.

(51) Int. Cl.
*B64U 70/70* (2023.01)
*B64C 27/10* (2023.01)
(Continued)

(52) U.S. Cl.
CPC .............. *B64U 70/70* (2023.01); *B64C 27/10* (2013.01); *B64C 27/50* (2013.01); *B64C 39/024* (2013.01);
(Continued)

(58) Field of Classification Search
CPC ........ B64U 10/17; B64U 70/50; B64U 70/70; B64C 11/28; B64C 27/50; F42B 10/58
See application file for complete search history.

(56) References Cited

U.S. PATENT DOCUMENTS 6,347,764 B1 * 2/2002 Brandon ................. F42B 10/58
102/388
2014/0299708 A1 10/2014 Green et al.
(Continued)

FOREIGN PATENT DOCUMENTS

KR 1109512 B1 * 1/2012
KR 10-1917785 B1 1/2019

OTHER PUBLICATIONS

International Search Report and Written Opinion dated Dec. 17, 2020, for Application No. PCT/US2020/034396.

*Primary Examiner* — Nicholas McFall
(74) *Attorney, Agent, or Firm* — Conley Rose, P.C.

(57) ABSTRACT

A projectile-launched aircraft system includes a projectile launcher including a triggering mechanism, a rotary-wing, hover-capable aircraft including a rotor assembly that includes at least one rotor blade, wherein the rotor blade includes a stowed configuration and a deployed configuration that is circumferentially spaced from the stowed configuration about a pivot axis, wherein, upon actuation of the triggering mechanism, the projectile launcher is configured to launch the aircraft along a flightpath.

19 Claims, 8 Drawing Sheets

(51) Int. Cl.
  *B64C 27/50* (2006.01)
  *B64C 39/02* (2023.01)
  *B64U 10/10* (2023.01)
  *F42B 10/14* (2006.01)
  *B64U 80/00* (2023.01)
  *B64U 101/30* (2023.01)
  *F41G 7/36* (2006.01)

(52) U.S. Cl.
  CPC ............ *B64C 39/028* (2013.01); *F42B 10/14* (2013.01); *B64U 10/10* (2023.01); *B64U 80/00* (2023.01); *B64U 2101/30* (2023.01); *F41G 7/36* (2013.01)

(56) References Cited

U.S. PATENT DOCUMENTS

| | | |
|---|---|---|
| 2018/0101169 A1 | 4/2018 | Applewhite |
| 2018/0244402 A1 | 8/2018 | Kahlon et al. |
| 2019/0077503 A1 | 3/2019 | Reddy et al. |

* cited by examiner

ROTARY-WING, HOVER-CAPABLE AIRCRAFT AND METHODS

CROSS-REFERENCE TO RELATED APPLICATIONS

This application is a 35 U.S.C. 371 national stage application of PCT/US2020/034396 filed May 22, 2020, and entitled "Rotary-Wing, Hover-Capable Aircraft and Methods", which claims benefit of U.S. provisional patent application No. 62/852,906 filed May 24, 2019, and entitled "Air Launched Hover-Capable Rotary-Wing Aircraft," both of which are hereby incorporated herein by reference in their entirety.

STATEMENT REGARDING FEDERALLY SPONSORED RESEARCH OR DEVELOPMENT

Not applicable.

BACKGROUND

Hover-capable, rotary-wing unmanned aircraft, including rotary wing micro air vehicles (MAVs), which rely on the rotation of one or more propellers thereof may have a variety of applications in intelligence, surveillance, reconnaissance (ISR), and search and rescue missions. Hover-capable, rotary-wing aircraft may be electrically powered via one or more batteries carried by the aircraft. In at least some applications, hover-capable, rotary-wing aircraft may have greater power requirements than fixed-wing, non-hover-capable aircraft of a similar size. The power requirements of hover-capable, rotary-wing aircraft may, in at least some applications, may limit the endurance, operating altitude, and/or operating range of the hover-capable, rotary-wing aircraft, thereby limiting the effectiveness of the aircraft.

BRIEF SUMMARY OF THE DISCLOSURE

An embodiment of a projectile-launched aircraft system comprises a projectile launcher comprising a triggering mechanism, a rotary-wing, hover-capable aircraft comprising a rotor assembly that comprises at least one rotor blade, wherein the rotor blade comprises a stowed configuration and a deployed configuration that is circumferentially spaced from the stowed configuration about a pivot axis, wherein, upon actuation of the triggering mechanism, the projectile launcher is configured to launch the aircraft along a flightpath. In some embodiments, the projectile launcher comprises a barrel configured to receive the aircraft and a cartridge comprising a propellant, and wherein the triggering mechanism is configured to initiate the propellant to launch the aircraft from the barrel. In some embodiments, the flightpath comprises at least one of a vertical flightpath and a ballistic flightpath. In certain embodiments, the aircraft comprises a motor configured to rotate the rotor blade and a control system configured to operate the motor to hover the aircraft at a deployment location that is spaced from the projectile launcher. In certain embodiments, the aircraft comprises an airframe comprising an outer surface comprising at least one first recess formed therein, wherein the first rotor blade is at least partially received in the first recess of the airframe when in the stowed configuration. In some embodiments, the aircraft comprises at least one second rotor blade that is spaced along a longitudinal axis of the aircraft from the first rotor blade, wherein the outer surface of the airframe comprises at least one second recess formed therein, and wherein the second rotor blade comprises a stowed configuration and a deployed configuration that is circumferentially spaced from the stowed configuration about a second pivot axis, and wherein the second rotor blade is at least partially received in the second recess of the airframe when in the stowed configuration. In some embodiments, the aircraft comprises a first gimbal pivotably coupled to the airframe whereby the first gimbal is permitted to pivot relative to the airframe about a first axis, wherein the first rotor blade is coupled to the first gimbal and is permitted to pivot about the first axis relative to the airframe. In certain embodiments, the aircraft comprises a second gimbal pivotably coupled to the airframe whereby the second gimbal is permitted to pivot relative to the airframe about a second axis that extends orthogonally to the first axis, wherein at least one of the first rotor assembly and the second rotor blade is coupled to the second gimbal and is permitted to pivot about the second axis relative to the airframe. In some embodiments, the aircraft comprises a motor assembly configured to rotate the first rotor blade and the second rotor blade, a first servo configured to adjust a position of the first gimbal about the first axis, a second servo configured to adjust a position of the second gimbal about the second axis, and a control system configured to operate the first servo to control a pitch of the aircraft, operate the second servo to control a roll of the aircraft, and to operate the motor assembly to control a yaw of the aircraft.

An embodiment of a rotary-wing, hover-capable aircraft comprises an airframe comprising an outer surface that comprises at least one first recess formed therein, a first rotor assembly rotatably coupled to the airframe and comprising at least one first rotor blade, wherein the first rotor blade comprises a stowed configuration and a deployed configuration that is circumferentially spaced from the stowed configuration about a first pivot axis, and wherein the first rotor blade is at least partially received in the first recess of the airframe when in the stowed configuration. In some embodiments, the aircraft further comprises a second rotor assembly rotatably coupled to the airframe and comprising at least one second rotor blade, wherein the second rotor assembly is spaced along a longitudinal axis of the aircraft from the first rotor assembly, wherein the outer surface of the airframe comprises at least one second recess formed therein, and wherein the second rotor blade comprises a stowed configuration and a deployed configuration that is circumferentially spaced from the stowed configuration about a second pivot axis, and wherein the second rotor blade is at least partially received in the second recess of the airframe when in the stowed configuration. In some embodiments, the aircraft further comprises a first motor configured to rotate the first rotor blade in a first rotational direction, and a second motor configured to rotate the second rotor blade in a second rotational direction opposite the first rotational direction. In certain embodiments, the aircraft further comprises a first gimbal pivotably coupled to the airframe whereby the first gimbal is permitted to pivot relative to the airframe about a first axis, wherein the first rotor assembly is coupled to the first gimbal and is permitted to pivot about the first axis relative to the airframe. In certain embodiments, the aircraft further comprises a second gimbal pivotably coupled to the airframe whereby the second gimbal is permitted to pivot relative to the airframe about a second axis that extends orthogonally to the first axis, wherein at least one of the first rotor assembly and the second rotor assembly is coupled to the second gimbal and is permitted to pivot about the second axis relative to the airframe. In some embodiments, the second gimbal is positioned radially within the first gimbal and is configured to pivot about both the first axis and the second axis relative to the airframe, and wherein the first rotor assembly is coupled to the second gimbal. In some embodiments, the aircraft further comprises a motor assembly configured to rotate the first rotor blade and the second rotor blade, a first servo configured to adjust a position of the first gimbal about the first axis, a second servo configured to adjust a position of the second gimbal about the second axis, and a control system configured to operate the first servo to control a pitch of the aircraft, operate the second servo to control a roll of the aircraft, and to operate the motor assembly to control a yaw of the aircraft. In certain embodiments, the aircraft comprises a first rotor assembly that comprises a plurality of circumferentially spaced first rotor blades and a rotor hub centrally positioned between the plurality of first rotor blades, and wherein a radially inner end of each first rotor blade couples to the rotor hub at one of a plurality of hinges.

An embodiment of a method for directing a rotary-wing, hover-capable aircraft along a flightpath comprises (a) launching the aircraft from a projectile launcher positioned at a launch location, (b) actuating a rotor blade of the aircraft from a stowed configuration and a deployed configuration that is circumferentially spaced from the stowed configuration about a pivot axis, and (c) hovering the aircraft at a deployment location that is spaced from the launch location. In some embodiments, (b) comprises operating a motor assembly of the aircraft to rotate the rotor blade about a rotational axis. In some embodiments, the first rotor blade is received in a recess formed in an outer surface of an airframe of the aircraft when the first rotor blade is in the stowed configuration.

BRIEF DESCRIPTION OF THE DRAWINGS

For a detailed description of exemplary embodiments of the disclosure, reference will now be made to the accompanying drawings in which.

DETAILED DESCRIPTION OF THE DISCLOSED EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, in at least some applications, hover-capable, rotary-wing aircraft may have greater power requirements than fixed-wing, non-hover-capable aircraft of a similar size. The requirements of hover-capable, rotary-wing aircraft may, in at least some applications, limit the endurance, operating altitude, and/or operating range of the hover-capable, rotary-wing aircraft. Additionally, the power requirements of the hover-capable, rotary-wing aircraft may require the use of a battery of increased size which may limit the performance of the aircraft and reduce the amount of payload (e.g., sensors and other equipment) which the aircraft may carry.

Embodiments disclosed herein include hover-capable, rotary-wing aircraft which may be launched as a projectile from a launcher positioned a first or launcher location to a second or deployment location distal the launcher location. For instance, the deployment location may be at a horizontal distance along the ground relative to the first location as well as at a different altitude than the launcher location. In this manner, the aircraft may utilize the energy imparted to the aircraft from the launcher to arrive at the deployment location without requiring the operation of one or more propellers of the aircraft. In some embodiments, the aircraft may be launched along a parabolic or ballistic trajectory or flightpath by the launcher towards the deployment location, and may only deploy one or more propellers of the aircraft once the aircraft is either within the vicinity of the deployment location or positioned at the deployment location. In other embodiments, the aircraft may be launched vertically upwards by the launcher towards the deployment location (positioned at an altitude above the launcher location), and may only deploy one or more propellers of the aircraft once the aircraft is either within the vicinity of the deployment location or positioned at the deployment location.

Figure 1:
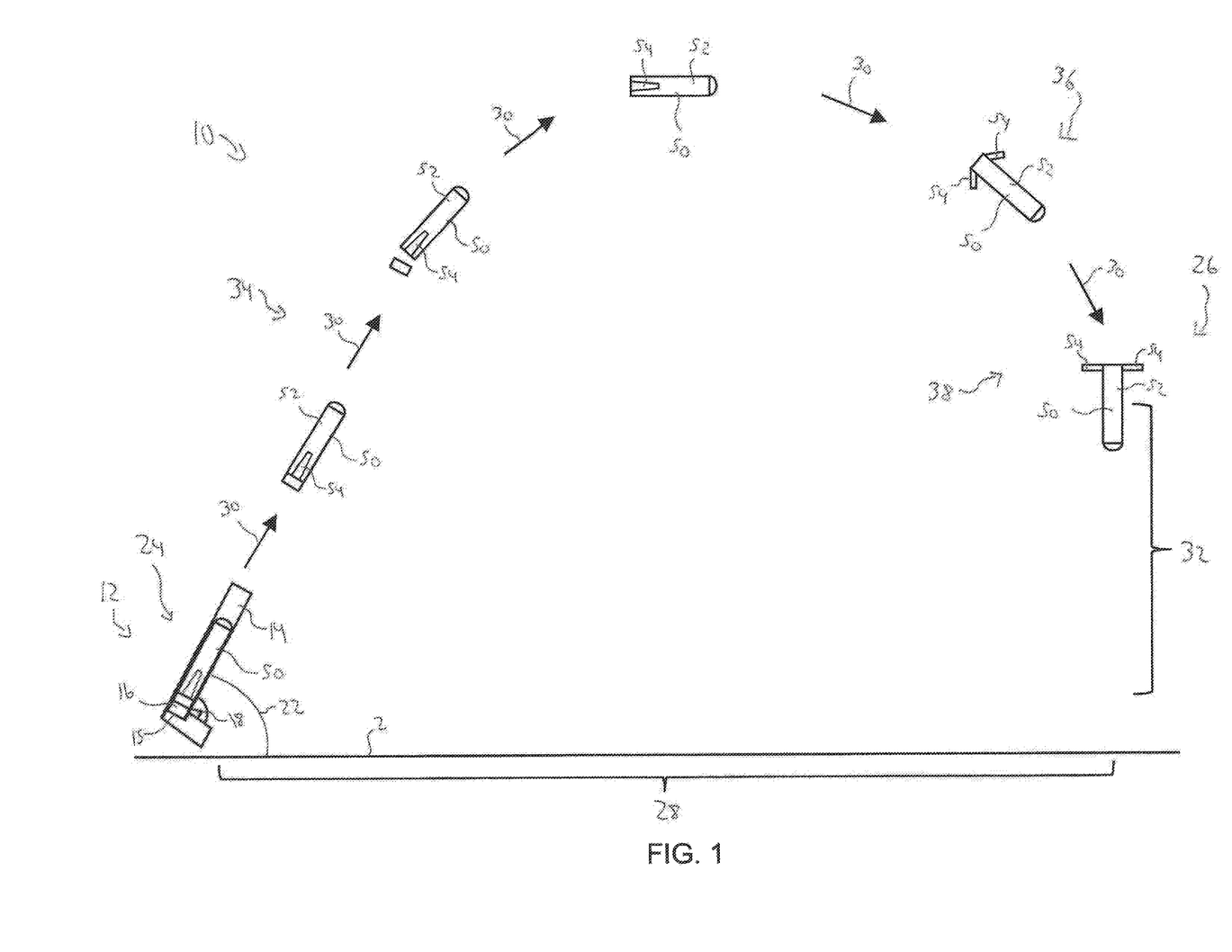
FIG. 1 is a schematic of a projectile-launched aircraft system according to some embodiments.
Figure 2:
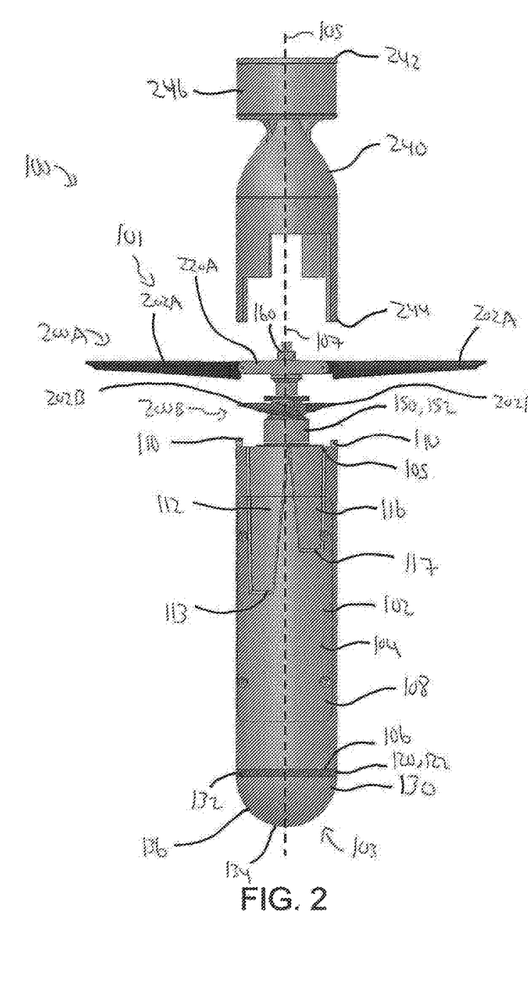
FIGS. 2, 3 are side views of a rotary-wing, hover-capable aircraft of the system of FIG. 1 according to some embodiments.

Referring to FIG. 1, an embodiment of a projectile-launched aircraft system 10 is shown in FIG. 1. In the embodiment of FIG. 1, system 10 generally includes a projectile launcher 12 and an unmanned hover-capable, rotary-wing aircraft 50 launchable from the projectile launcher 12. As used herein, the term "hover-capable" describes aircraft capable of hovering flight. Projectile launcher 12 may generally comprise a generally cylindrical firing tube or barrel 14, a cartridge 16, and a triggering mechanism or trigger 18.

Barrel 14 of projectile launcher 12 is configured to slidably receive aircraft 50 and, in some embodiments, may have an inner diameter of less than 100 millimeters (mm) (e.g., between approximately 40 mm and 60 mm). Cartridge 16 may also be received within barrel 14 of projectile launcher 12 between aircraft 50 and an enclosed end 15 of barrel 14. Cartridge 16 may comprise a propellant and an ignition device or primer configured to initiate the propellant in response to receiving a firing signal. In some embodiments, the propellant and primer may each be enclosed within an outer case. The propellant may comprise a material configured to rapidly create pressurized gas to launch aircraft 50 from projectile launcher along an airborne parabolic or ballistic trajectory or flightpath (indicated by arrows 30 in FIG. 1). In some embodiments, the propellant of cartridge 16 may comprise a combustible or explosive material. Trigger 18 of projectile launcher may selectably issue a firing signal to cartridge 16 in response to actuation by a user of projectile launcher 12. For example, upon actuation, trigger 18 may percussively actuate the primer of cartridge 16 to ignite a propellant of cartridge 16.

As described above, projectile launcher 12 is generally configured to convert energy (e.g., chemical energy) stored within cartridge 16 into kinetic energy of aircraft 50. Although in the embodiment shown in FIG. 1 a cartridge 16 is used as a source of energy that may be converted into kinetic energy of aircraft 50, in other embodiments, the source of energy which may be converted into kinetic energy of aircraft 50 may vary. For instance, pneumatic, hydraulic, and/or electrical sources of energy may be utilized for launching aircraft 50. Further, in some embodiments, aircraft 50 may not be launched from a cylindrical tube such as the barrel 14 of projectile launcher 12. For example, aircraft 50 may be launched along an airborne flightpath (e.g., ballistic flightpath 30 shown in FIG. 1) using a rail, catapult, or other mechanism.

Aircraft 50 of system 10 may generally include a body or airframe 52 and one or more rotors 54 rotatably coupled to airframe 52. Rotors 54 may each be disposed in a stowed configuration when aircraft 50 is positioned within the barrel 14 of projectile launcher 12. In the stowed configuration, each rotor 54 may extend substantially parallel a longitudinal axis of aircraft 50 and positioned against an outer surface of airframe 52 in order to minimize a maximum outer diameter of aircraft 50 and thereby permit aircraft 50 to be loaded into barrel 14. As will be described further herein, rotors 54 may be actuated from the stowed configuration to a deployed configuration. In the deployed configuration, rotors 54 may be rotated by a motor (not shown in FIG. 1) of aircraft 50 to allow aircraft 50 to hover and perform one or more functions at a deployment location 26 distal the projectile launcher 12.

In some embodiments, the barrel 14 of projectile launcher 12 may be positioned at a non-zero, acute angle 22 relative to the ground 2 to achieve the ballistic flightpath 30 of aircraft 50 following the actuation of the trigger 18 of projectile launcher 12. For example, in some embodiments, projectile launcher 12 may be light enough to manually aim by a user of projectile launcher 12; however, the manner in which projectile launcher 12 may be positioned may vary in different applications. In this embodiment, the barrel 14 of projectile launcher 12 is positioned at acute angle 22 relative to the surface 2 to launch aircraft 50 from a first or launch location 24, along ballistic flightpath 30, to the second or deployment location 26 distal the launch location 24.

The deployment location 26 at which aircraft 50 is positioned after being launched from projectile launcher 12 may be spaced a horizontal distance 28 along the ground 2 relative to the launch location 24. Additionally, the deployment location 26 of aircraft 50 may be spaced a vertical distance or altitude 32 relative to the launch location 24. Thus, the energy transferred to aircraft 50 from projectile launcher 12 may be utilized to position aircraft 50 at a desired horizontal position along surface 2 and at a desired vertical distance or altitude from surface 2. By utilizing projectile launcher 12 as an energy source for displacing aircraft 50 from the launch location 24 to the deployment location 26, energy stored within aircraft 50 (e.g., batteries, fuel) need only be utilized once the aircraft 50 is travelling towards or has arrived at the deployment location 26 for performing one or more functions at the deployment location 26 (e.g., surveillance, etc.). In other words, by utilizing projectile launcher 12 to impart kinetic energy to aircraft 50, the amount of energy stored within aircraft 50 needed for positioning aircraft 50 at the deployment location 26 may be minimized, thereby maximizing the amount of energy stored within aircraft 50 which may be utilized for performing one or more functions at the deployment location 26. For instance, by utilizing projectile launcher 12 for transporting aircraft 50 to the deployment location 26, a payload of aircraft 50 and/or the amount of time aircraft 50 may loiter at operating position 26 may be increased.

Although in this embodiment barrel 14 of projectile launcher 12 is positioned at acute angle 22 relative to the ground 2 to produce a ballistic flightpath 30 of aircraft 50, in other embodiments, the position of barrel 14 may be altered to produce different trajectories of aircraft 50. For example, barrel 14 of projectile launcher 12 may be positioned at a substantially orthogonal or ninety degree angle relative to the ground 2 to launch aircraft 50 along a vertical flightpath to an operating position that is vertically spaced from projectile launcher 12 but it has minimal or zero horizontal spacing along ground 2 relative to projectile launcher 12.

In his embodiment, the flight of aircraft 50 along ballistic flightpath 30 may include one or more stages. Particularly, the ballistic flightpath 30 of aircraft 50 may include an ascent or projectile phase 34, a descent phase 36 following the projectile phase 34, and a hover phase 38 following the descent phase 36. In some embodiments, during the projectile phase 34 of ballistic flightpath 30 the aircraft 50 is initially launched from the barrel of projectile launcher 12 following the actuation of trigger 18. During the projectile phase 34, aircraft 50 ascends or travels vertically upwards away from ground 2 along the ballistic flightpath 30 in response to a force applied to the aircraft 50 from the ignition of cartridge 16. Additionally, in some embodiments, a protective load transfer cap or cover 56 positioned between aircraft 50 and cartridge 16 within the barrel 14 of projectile launcher 12 to protect components of aircraft 50 (e.g., rotors 54) from the shock following the ignition of cartridge 16. Load transfer cap 56 may fall away from aircraft 50 at some point during the projectile phase 34 of ballistic flightpath 30.

Aircraft 50 may reach the apex of the ballistic flightpath 30 at the end of the projectile phase 34 thereof and begin the descent phase 36. In the descent phase 36 of ballistic flightpath 30, aircraft 50 may deploy one or more of the rotors 54 of aircraft 50 prior to reaching the hover phase 38 of ballistic flightpath 30. In some embodiments, a motor of aircraft 50 may rotate one or more of the rotors 54 whereby the centripetal force applied to the one or more rotating rotors 50 may force the rotors radially outwards (relative a longitudinal axis of aircraft 50) from the stowed configuration into a deployed configuration. In other embodiments, different mechanisms may be used to deploy one or more rotors 54 of aircraft 50 during the descent phase. For instance, one or more dedicated actuators of aircraft 50 may be used to deploy rotors 54.

Once rotors 54 of aircraft 50 are disposed in the deployed configuration, a rotational speed of each rotor 54 may be increased whereby thrust sufficient for aircraft 50 to hover above ground 2 and allow aircraft 50 to enter the hover phase 38 of ballistic flightpath 30. In this embodiment, thrust generated by rotors 54 may be used to slow or terminate the descent of aircraft 50 towards the ground 2 such that aircraft 50 may hover and maintain a desired altitude above ground 2. In some embodiments, aircraft 50 may include a device configured to induce drag (e.g., a parachute, etc.) during the descent phase 36 to assist in terminating the descent of aircraft 50. Additionally, in some embodiments, aircraft 50 may include a stabilizer configured to assist in stabilizing the trajectory of aircraft 50 over ballistic flightpath 30. Aircraft 50 is located at operating position 26 upon reaching the hover phase 38 of ballistic flightpath 30 and may comment performing one or more functions at location 26. For example, aircraft 50 may comprise a payload including one or more sensors for acquiring data and performing ISR operations at the deployment location 26.

During the travel of aircraft 50 along ballistic flightpath 30, the motor of aircraft 50 may only be operated during the descent and hovering stages 36, 38. Therefore, the motor of aircraft 50 need not be operated during the ascent phase 34 of flightpath 30 and thus aircraft 50 need only rely on the energy imparted to aircraft 50 from projectile launcher 12 to reach the apex or maximum altitude of ballistic flightpath 30. In this manner, the amount of energy expended by the motor of aircraft 50 prior to entering the hovering stage 38 at the deployment location 26 may be minimized.

Referring to FIGS. 2-7, an embodiment of an unmanned hover-capable, rotary-wing aircraft 100 is shown in FIGS. 2-7. Aircraft 100 may be utilized in projectile-launched aircraft systems similar to the system 10 described above and shown in FIG. 1. Thus, aircraft 100 may be launched from a projectile launcher (e.g., projectile launcher 12) at a launch position, travel along an airborne flightpath (e.g., a ballistic flightpath, a vertical flightpath, etc.), and arrive at a deployment position distal the launch position to perform one or more functions (e.g., ISR, etc.).

In some embodiments, aircraft 100 may have a longitudinal first end 101, a longitudinal second end 103 opposite first end 101, a central longitudinal axis 105 and may generally include a support structure or airframe 102, a powertrain 150, a pair of counter-rotating rotors or rotor assemblies 200A, 200B, a protective load transfer cap or cover 240, an actuator or thrust vectoring assembly 250, and a control system 350.

In some embodiments, aircraft 100 is configured to be launched along a ballistic flightpath (e.g., flightpath 30 shown in FIG. 1) from a projectile launcher (e.g., projectile launcher 12 shown in FIG. 1). Particularly, within a launch tube of the projectile launcher, load transfer cap 240 may be positioned between rotor assemblies 200A, 200B (each located at the first end 101 of aircraft 100) and a cartridge (e.g., cartridge 16 of FIG. 1) of the projectile launcher. Load transfer cap 240 may include a longitudinal first end 242, a longitudinal second end 244 opposite first end 242, the first end 242 being positionable adjacent the cartridge when aircraft 100 is loaded in the projectile launcher. Load transfer cap 240 may protect components of aircraft 100 (e.g., rotor assemblies 200A, 200B) from shock generated by the initiation of the cartridge of the projectile launcher. Additionally, load transfer cap 240 may also include a fin or stabilizer 246 proximal first end 242 for stabilizing the flight of aircraft 100 following the launch of aircraft 100 from the projectile launcher; however, in other embodiments, load transfer cap 240 may not include stabilizer 246.

In some embodiments, airframe 102 may provide structural support to and anchor the components of aircraft 100 (e.g., rotor assemblies 200A, 200B, thrust vectoring assembly 250, control system 350, etc.) and may generally include a generally cylindrical body 104 (body 104 is hidden from view in FIG. 5) and a nose 130 coupled to the body 104. In some embodiments, components of the airframe 102 (e.g., body 104, nose 130) may be fabricated from acrylonitrile butadiene styrene (ABS) plastic; however, in other embodiments, the materials comprising airframe 102 may vary.

Body 104 may comprise a central or longitudinal axis 107 and have a longitudinal first end 105 and a longitudinal second end 106 opposite the first end 105, and a generally cylindrical outer surface 108 extending between ends 105, 106. In some embodiments, outer surface 108 of body 104 may be smoothed or polished to provide a smooth contact surface between body 104 and an inner surface of a barrel of a projectile launcher from which aircraft 100 is launched. One or more components of aircraft 100 (e.g., thrust vectoring assembly 250, control system 350, etc.) may be at least partially disposed within a central passage formed within body 104. In some embodiments, body 104 may include a removable panel to allow access to components of aircraft 100 stored within body 104. Body 104 may comprise a pair of circumferentially spaced pivot joints or connectors 110 located at the first end 105 thereof. As will be described further herein, at least a portion of the thrust vector assembly 200 may pivotably couple with body 104 via the pivot joints 110. In this embodiment, pivot joints 110 are spaced approximately 180 degrees apart about central axis 105 of aircraft 100; however, in other embodiments, the circumferential spacing of pivot joints 110 may vary.

In some embodiments, the outer surface 108 of body 104 may include a pair of first rotor recesses 112 and a pair of second rotor recesses 116. Particularly, each rotor recess 112, 116 is formed within outer surface 108 of body 104 such that the outer diameter of body 104 defined by outer surface 108 is reduced along the portions of outer surface 108 covered by recesses 112, 116. Additionally, each recess 112, 116 extends from first end 105 of body 104 to a terminal end 113, 117, respectively, which is spaced from the second end 106 of body 104. In this embodiment, the first rotor recesses 112 are spaced approximately 180 degrees apart about central axis 105. Similarly, the second rotor recesses 116 are spaced approximately 180 degrees apart about central axis 105; however, in other embodiments, the circumferential spacing of the pair of first rotor recesses 112 and the circumferential spacing between the pair of second rotor recesses 116 may vary. Additionally, each second rotor recess 116 may be circumferentially spaced from each first rotor recess 112.

Figure 3:
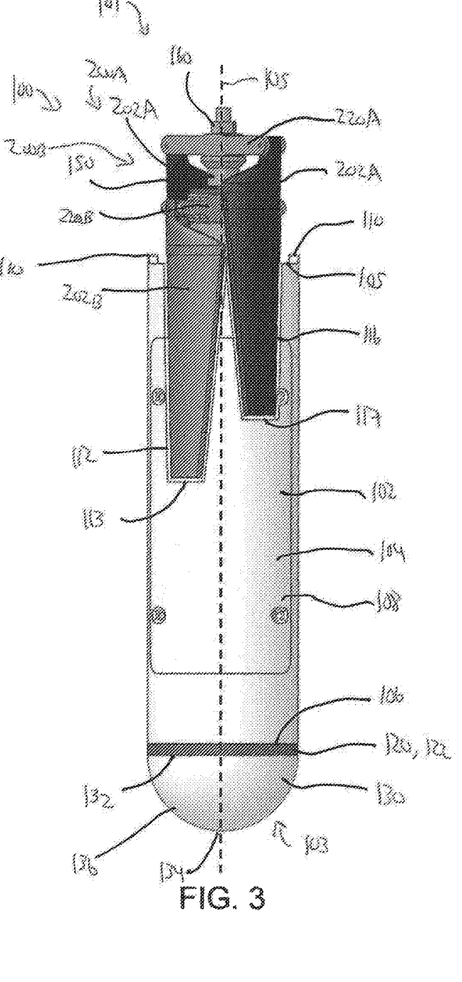
Figure 4:
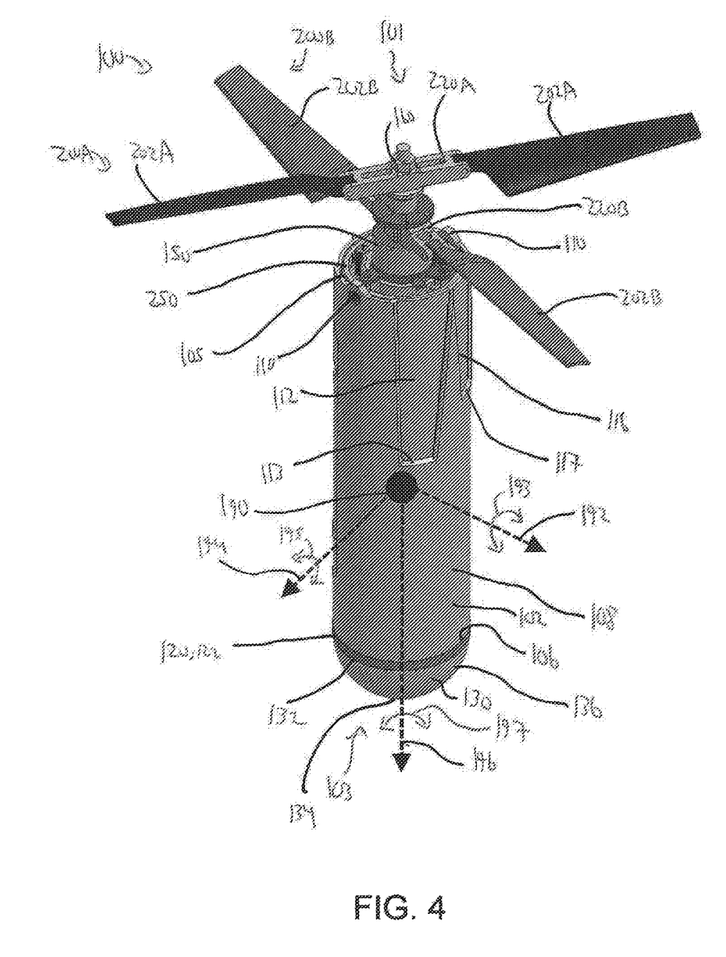
FIGS. 4, 5 are perspective views of the aircraft of FIGS. 2, 3.
Figure 5:
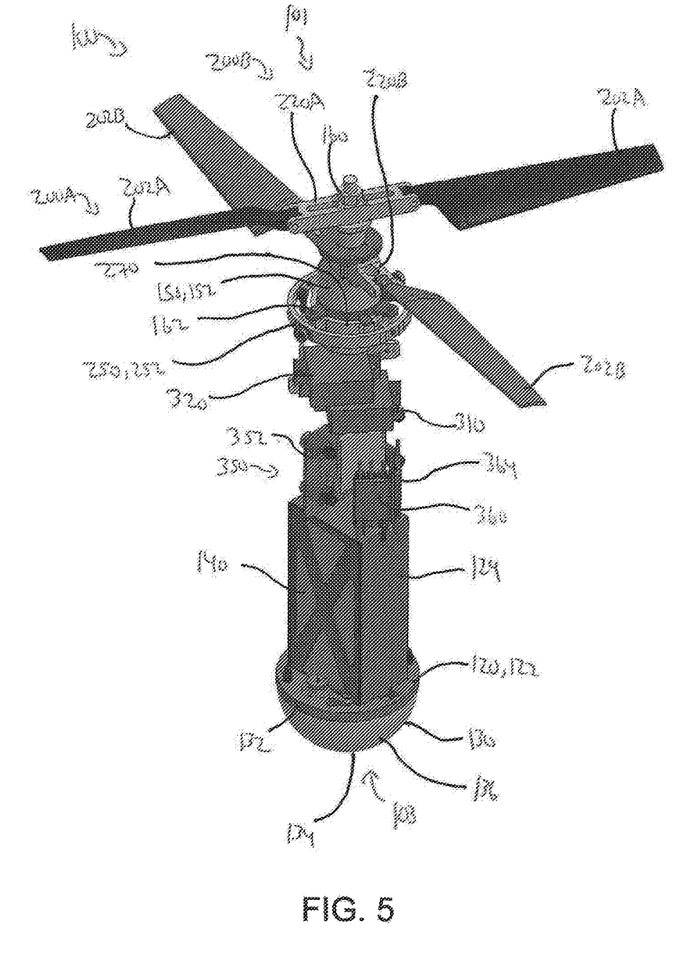
Figure 6:
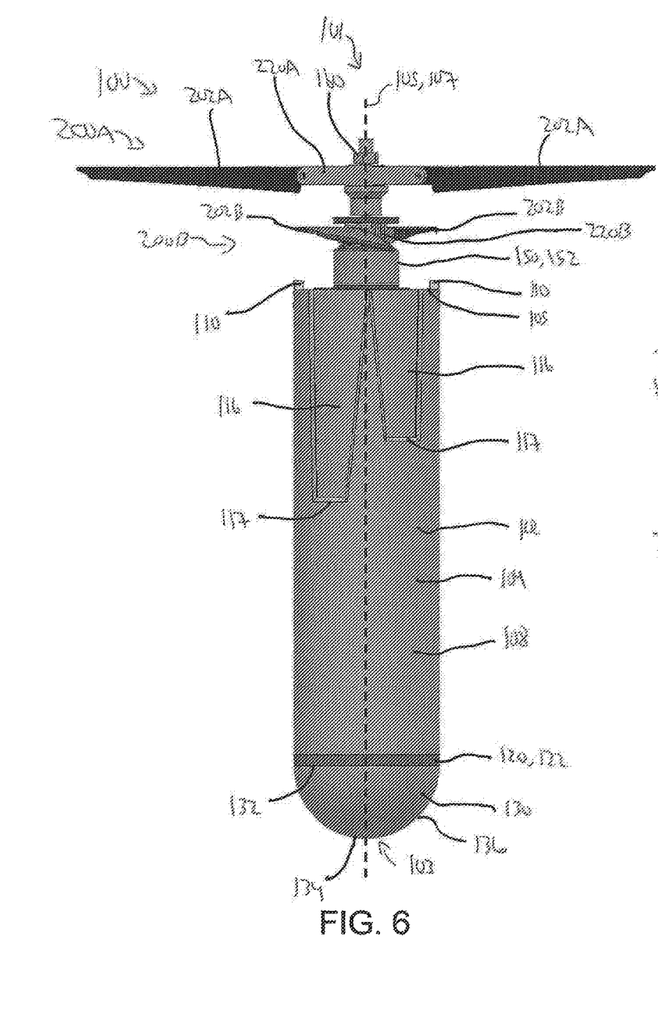
FIG. 6 is a side view of the aircraft of FIGS. 2, 3 opposite the side view shown in FIG. 2.

As will be discussed further herein, each first rotor recess 112 is configured to receive a rotor blade 202A of the first rotor assembly 200A while each second rotor recess 116 is configured to receive a rotor blade 202B of the second rotor assembly 200B whereby each rotor blade 202A, 202B of the rotor assemblies 200A, 200B may be positioned substantially flush with body 104 when each rotor assembly 200A, 200B is disposed in a stowed configuration (shown in FIG. 3). In some embodiments, an outer diameter extending between an outer surface 206 of each separate pair of rotor blades 202A, 202B (e.g., a diameter extending between the pair of rotor blades 202A, 202B of first rotor assembly 200A) is equal to or less than a maximum outer diameter of the outer surface 108 of body 104. In this manner, rotor recesses 112, 116 of body 104 may serve to minimize a maximum outer diameter of aircraft 100 and protect the rotor blades 202A, 202B of each rotor assembly 200A, 200B, respectively during the launch of aircraft 100 from a projectile launcher (e.g., projectile launcher 12 shown in FIG. 1).

Airframe 102 may additionally include a power supply mount 120 coupled between body 104 and nose 130, where power supply mount 120 is generally configured to provide structural support to a power supply 140 of aircraft 100. In this embodiment, power supply mount 120 may comprise an annular flange 122 and a rectangular cage or holder 124 extending from flange 122. The power supply 140 of aircraft 100 may be received within holder 124. Particularly, relative movement between power supply 140 and airframe 102 may be restricted when power supply 140 is received within holder 124 and power supply mount 120 is coupled to the body 104 and nose 130 of airframe 102.

In this embodiment, power supply 140 of aircraft 100 comprises an electrical battery pack configured to provide electrical power to components of aircraft 100, including powertrain 150, thrust vectoring assembly 250, and control system 350. In some embodiments, power supply 140 may comprise a lithium polymer battery configured to output approximately 1,000 milliamp hours (mAh) and 1,500 mAh to allow aircraft 100 to hover for periods in excess of ten minutes; however, in other embodiments, the configuration of power supply 140 may vary. For example, in other embodiments, power supply 140 may comprise fuel storing chemical energy for powering the operation of aircraft 100 rather than a battery pack storing electrical energy.

The nose 130 of airframe 102 comprises a longitudinal first end 132 and a longitudinal second end 134 opposite the first end 132 and which defines the second end 103 of aircraft 100. In some embodiments, the flange 122 of the power supply mount 120 may be coupled between the first end 132 of the nose 130 and the second end 106 of the body 104 of airframe 102. Nose 130 may include a hemispherical outer surface 136 to reduce the drag of aircraft 100 as it travels along a ballistic flightpath; however, the configuration of nose 130 may vary in other embodiments.

Figure 8:
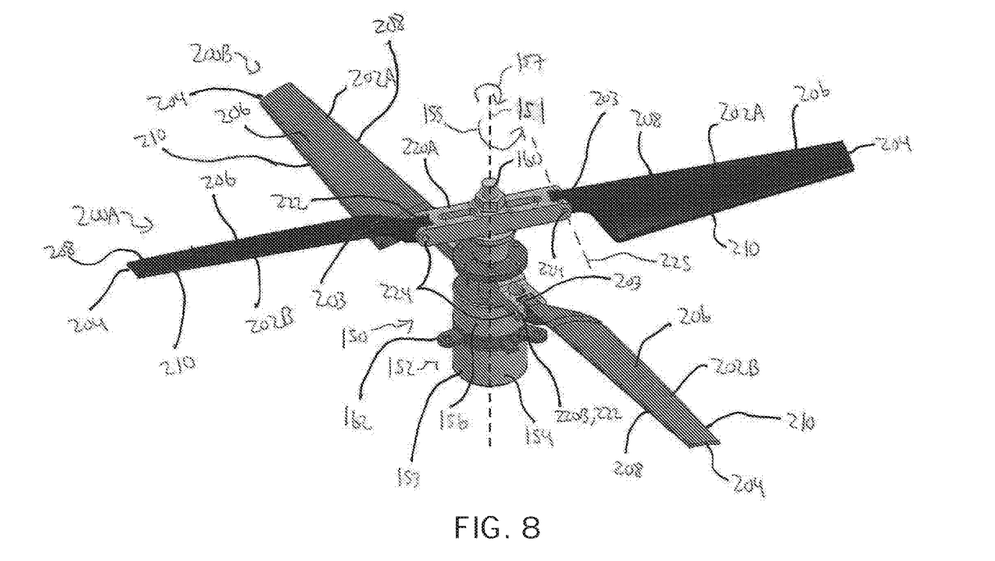
FIG. 8 is a perspective view of a powertrain, a first rotor assembly, and a second rotor assembly of the aircraft of FIGS. 2, 3 according to some embodiments.
Figure 9:
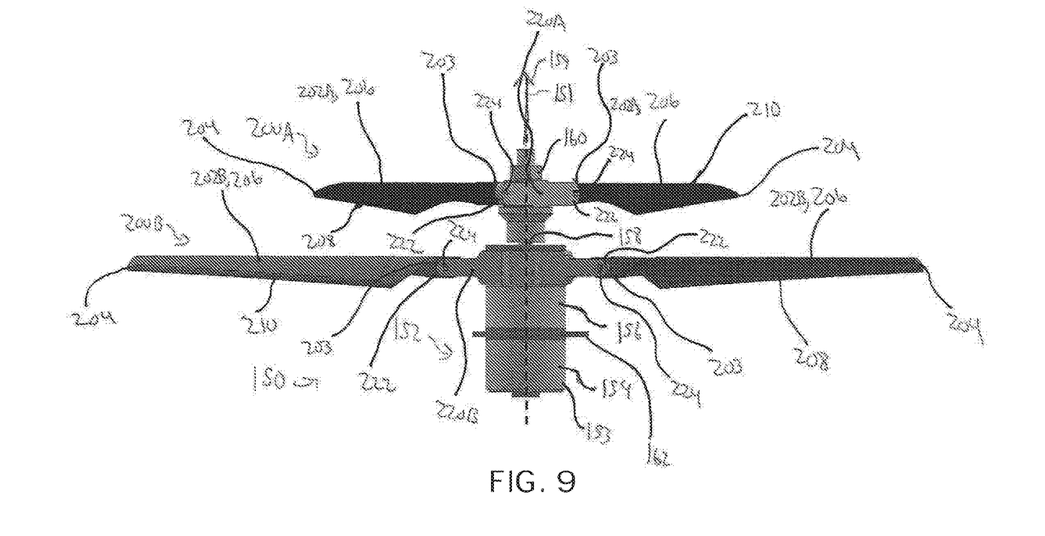
FIG. 9 is a side view of the powertrain, first rotor assembly, and second rotor assembly of FIG. 8.

Referring to FIGS. 8, 9, views of the powertrain 150 of aircraft 100 are shown. In some embodiments, powertrain 150 may generally include a counter-rotating motor assembly 152 that includes a first motor 154 and a second motor 156. Motors 154, 156 of motor assembly 152 may be electrically connected with and powered by the power supply 140 of aircraft 100. As will be described further herein, control system 350 of aircraft 100 may independently control the operation of each motor 154, 156. First motor 154 is coupled to first rotor assembly 200A via a first or inner driveshaft 158 which extends through both second motor 156 and second rotor assembly 200B. Second motor 156 is coupled to second rotor assembly 200B via a second or outer driveshaft (hidden from view in FIGS. 8, 9) which extends annularly about the inner driveshaft 158. A fastener or nut 160 may secure rotor assemblies 200A, 200B to the motors 154, 156 of motor assembly 152. Additionally, motor assembly 150 may comprise an annular mount 162 positioned about an outer surface 153 of motor assembly 152. As will be described further herein, mount 162 of motor assembly 152 may pivotably couple with motor assembly 152 to permit motor assembly 152 (along with rotor assemblies 200A, 200B coupled thereto) to pivot about a plurality of orthogonal axes relative to the airframe 102 of aircraft 100.

In some embodiments, motors 154, 156 may each comprise brushless electric motors separated by bearings (not shown in FIGS. 8, 9) which permit rotors of motors 154, 156 to rotate in opposite directions. Additionally, in some embodiments, motor assembly 152 may collectively produce approximately between four and ten Newtons (N) of thrust; however, in other embodiments, the configuration and performance of motor assembly, as well as the relative positioning of motors 154, 156 and rotor assemblies 200A, 2006, may vary.

In the configuration described above, first motor 154 is configured to rotate first rotor assembly 200A in a first rotational direction (indicated by arrow 155 in FIG. 8) about a rotational axis 151 extending centrally through thrust vectoring assembly 250 while second motor 156 is configured to rotate second rotor assembly 200B about a second rotational direction (indicated by arrow 157 in FIG. 8) about the rotational axis 151, where the second rotational direction 157 is opposite of the first rotational direction 155. In other words, motor assembly 152 of aircraft 100 is configured to counter-rotate rotor assemblies 200A, 200B coaxially about the rotational axis 151. Although rotor assemblies 200A, 200B counter-rotate, the rotor blades 202A, 202B of rotor assemblies 200A, 200B, respectively, are configured to provide a unified or singular thrust vector (indicated by arrow 159 in FIG. 9) in response to the counter-rotation of rotor assemblies 200A, 200B.

Still referring to FIGS. 8, 9, in some embodiments, first rotor assembly 200A may be spaced along central axis 105 of aircraft 100 from second rotor assembly 200A. Additionally, first rotor assembly 200A may comprise a pair of first rotor blades 202A and a first rotor hub 220A while second rotor assembly 200B may comprise a pair of second rotor blades 202B and a second rotor hub 220B. In the interest of simplicity, first rotor blades 202A and first rotor hub 220A of first rotor assembly 200A are described in detail below. However, second rotor blades 202B and second rotor hub 200 of second rotor assembly 200A may be similar in configuration to first rotor blades 202A except that second rotor blades 202B are configured for rotation in the second rotational direction 157 while the first rotor blades 202A are configured for rotation in the first rotational direction 155. Additionally, the second rotor hub 220B of second rotor assembly 200B may be similar in configuration the first rotor hub 220A of first rotor assembly 200A. Thus, rotor blades 202A, 202B and rotor hubs 220A, 220B include features in common and shared features are labeled similarly.

Each first rotor blade 202A comprises a radially inner end or root 203, a radially outer end 204, the outer surface 206 extending between ends 203, 204, a leading edge 208 extending between ends 203, 204, and a trailing edge 210 extending between ends 203, 204. In some embodiments, each first rotor blade 202A may have a maximum outer diameter (when in the deployed configuration) of approximately between 200 mm and 250 mm, a thickness of approximately between 1.0 mm and 2.0 mm, a 75% span angle of approximately between 15.0 degrees and 20 degrees, a twist of approximately between 6.5 degrees and 8.0 degrees, and a solidity of approximately between 0.05 and 0.08. Additionally, in some embodiments, each rotor blade 202A may be manufactured using a rapid prototyping technique using polylactic acid (PLA) or carbon reinforced fiber polymers (CRFP). However, in other embodiments, the configuration and process of manufacturing of each first rotor blade 202A (as well as each similarly configured second rotor blade 202B) may vary.

In some embodiments, the first rotor hub 220A of each rotor assembly 200A, 200B comprises a central passage for receiving the inner shaft 158 of motor assembly 152 and a pair of opposed radially outer ends 222. Each radially outer end 222 of first rotor hub 220A may comprise a hinge 224 pivotably connected to the radially inner end 203 of one of the first rotor blades 202A. In this configuration, each first rotor blade 202A may pivot about a pivot axis 225 (one of which is shown in FIG. 8) that extends orthogonal central axis 105 of aircraft 100 and which is defined by the hinge 224 coupling the first rotor blade 202A to the first rotor hub 220A. Particularly, each first rotor blade 202A may pivot about pivot axis 225 between a stowed configuration (not shown in FIGS. 8, 9) and a deployed configuration (shown in FIGS. 8, 9).

In the stowed configuration, a longitudinal axis of each first rotor blade 202A of the first rotor assembly 200A may extend along a longitudinal axis which extends substantially parallel with central axis 105 of aircraft 100. In the deployed configuration, the longitudinal axis of each first rotor blade may extend substantially orthogonal to central axis 105. In some embodiments, each hinge 224 of first rotor hub 220A may include a mechanical stop configured to prevent the first rotor blade 202A attached thereto from pivoting beyond a substantially orthogonal position (relative central axis 105) when the rotor blade 202A is actuated from the stowed configuration to the deployed configuration. Additionally, in some embodiments, each first rotor blade 202A may pivot approximately ninety degrees about pivot axis 225 when the first rotor blade 202A pivots between the stowed and deployed configurations; however, in other embodiments, the relative positioning of the stowed and deployed configurations of each first rotor blade 202A may vary.

In some embodiments, each hinge 224 of first rotor hub 220A is configured to impart enough friction or resistance to pivoting of each first rotor blade 202A about its respective pivot axis 225 such that first rotor blades 202A do not flap (e.g., cyclically pivot about its respective pivot axis 225) during operation of aircraft 100. In some embodiments, following the launching of aircraft 100 from a projectile launcher, the friction imparted by each hinge 224 of first rotor hub 220A may maintain each first rotor blade 202A in the stowed configuration until first motor 154 of motor assembly 152 is actuated (e.g., during the decent phase of the flightpath of aircraft 100) to rotate in the first rotational direction 155. In some embodiments, the centripetal force applied to each first rotor blade 202A in response to the rotation of first rotor assembly 200A in the first rotational direction 155 overcomes the friction imparted by each hinge 224, forcing each first rotor blade 202A radially outwards into the deployed configuration. In other embodiments, an actuator may control the actuation of each first rotor blade 202A between the stowed and deployed configurations.

Figure 7:
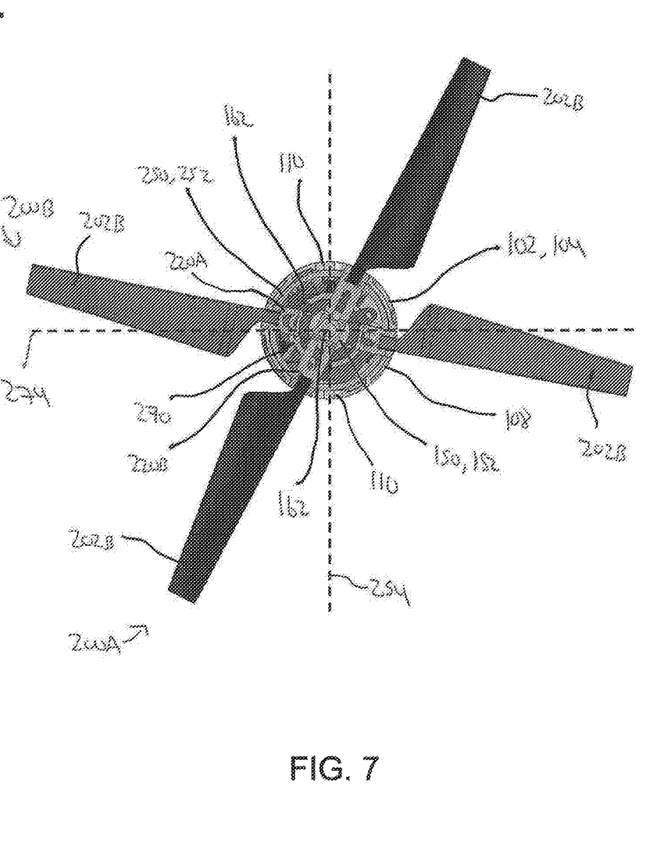
FIG. 7 is a top view of the aircraft of FIGS. 2, 3.
Figure 10:
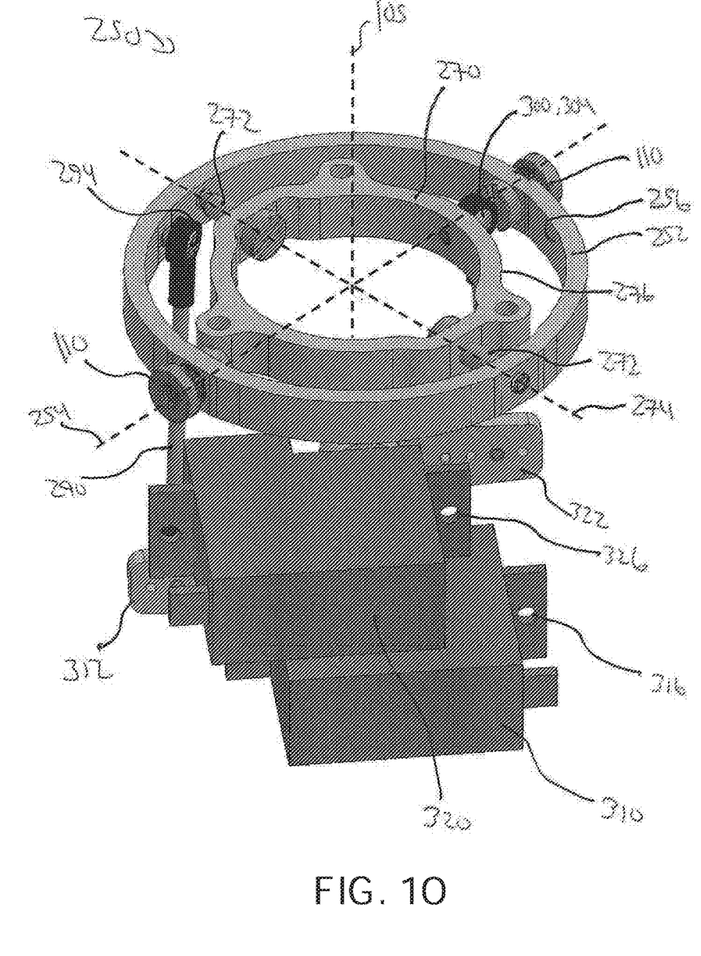
FIGS. 10, 11 are perspective views of a thrust vectoring assembly of the aircraft of FIGS. 2, 3 according to some embodiments.
Figure 11:
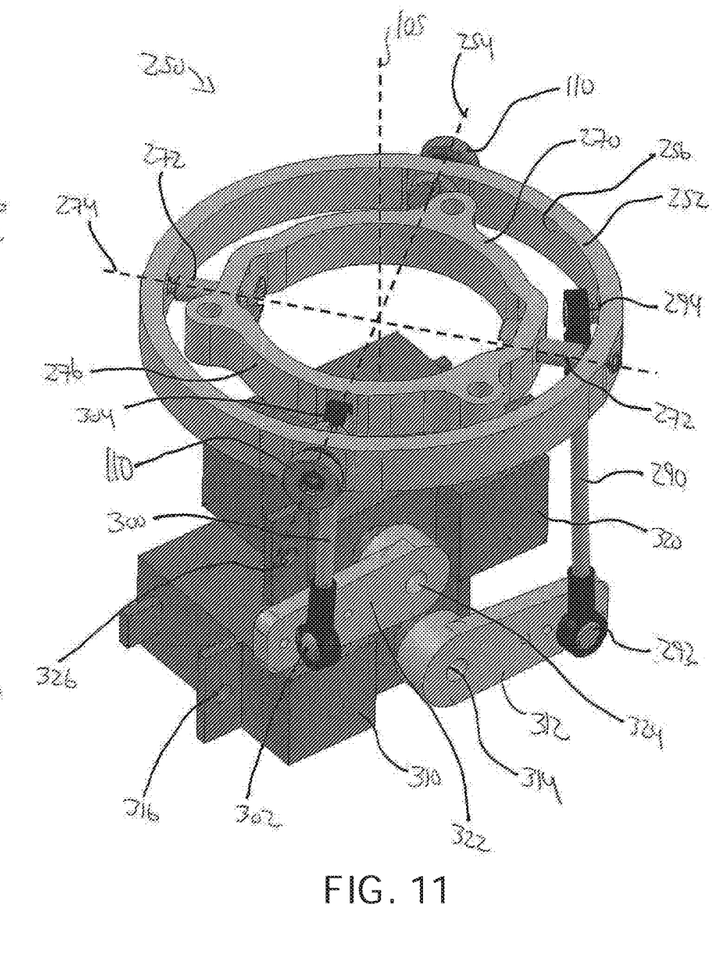

Referring to FIGS. 7, 10, and 11, views of the thrust vectoring assembly 250 of aircraft 100 are shown in FIGS. 10, 11. Thrust vectoring assembly 250 is generally configured to control an orientation of each rotor assembly 200A, 200B relative airframe 102 to thereby selectably orient or control a vector of the thrust produced by rotor assemblies 200A, 200B. The hovering flight of aircraft 100 may be at least partially controlled by vectoring the thrust produced by rotor assemblies 200A, 200B using thrust vectoring assembly 250.

In some embodiments, thrust vectoring assembly 250 of aircraft 100 generally includes an annular first or our gimbal 252, an annular second or inner gimbal 270, a pitch control rod 290, a roll control rod 300, a pitch actuator or servo 310, and a roll actuator or servo 320. The pair of pivot connectors 110 of airframe 102 may extend through outer gimbal 252 at circumferentially opposed (e.g., spaced 180 degrees apart about central axis 105) locations along the perimeter of outer gimbal 252 to pivotably couple the outer gimbal 252 to the body 104 of airframe 102. Particularly, a roll control axis 254 may extend through and be defined by the position of pivot connectors 110 whereby outer gimbal 252 and inner gimbal 270 may each pivot relative the airframe 102 about the roll control axis 254.

The inner gimbal 270 of thrust vectoring assembly 250 may couple with the mount 162 of motor assembly 152 via one or more fasteners (not shown in FIGS. 10, 11). Additionally, inner gimbal 270 may be pivotably connected to the outer gimbal 252 by a pair of circumferentially spaced pivot connectors 272 extending radially through the inner gimbal 270 and into a radially inner surface 256 of the outer gimbal 252. In this configuration, pivot connectors 272 may comprise inner pivot connectors 272 while pivot connectors 110 comprise outer pivot connectors 110. Each inner pivot connector 272 may be spaced approximately ninety degrees from one of the outer pivot connectors 110, thereby defining a pitch control axis 274 which extends through inner pivot connectors 272. In some embodiments, pitch control axis 274 extends orthogonal roll control axis 254. In addition, roll control axis 254 may extend orthogonally to pitch control axis 274. Depending on the orientation of outer gimbal 252, axes 254, 274 may each be disposed orthogonal the central axis 107 of the body 104 of airframe 102.

The pitch control rod 290 of thrust vectoring assembly 250 may extend from a first ball joint 292 positioned at a longitudinal first end of pitch control rod 290 to a second ball joint 294 positioned at a longitudinal second end of pitch control rod 290. The first ball joint 292 of pitch control rod 290 is coupled to an actuator arm 312 that is pivotally coupled to pitch servo 310 at a pivot joint 314. The second ball joint 294 of pitch control rod 290 is pivotably coupled to the inner surface 256 of outer gimbal 252. Pitch servo 310 is configured to selectably pivot control arm 312 about a pivot axis defined by pivot joint 314 to linearly displace pitch control rod 290 and, via the pivotable connection between ball joint 294 and outer gimbal 252, rotate outer gimbal 252 and inner gimbal 270 relative airframe 102 in either rotational direction about pitch control axis 254.

The roll control rod 300 of thrust vectoring assembly 250 may similarly extend from a first ball joint 302 positioned at a longitudinal first end of roll control rod 300 to a second ball joint 304 positioned at a longitudinal second end of roll control rod 300. The first ball joint 302 of roll control rod 300 is coupled to a control arm 322 that is pivotally coupled to roll servo 320 at a pivot joint 324. The second ball joint 304 of roll control rod 300 is pivotably coupled to an outer surface 276 of inner gimbal 270. Roll servo 320 is configured to selectably pivot control arm 322 about a pivot axis defined by pivot joint 324 to linearly displace roll control rod 300 and, via the pivotable connection between second ball joint 304 and inner gimbal 270, rotate inner gimbal 270 relative to outer gimbal 252 and airframe 102 in either rotational direction about roll control axis 274.

Each servo 310, 320 of thrust vectoring assembly 250 comprises a mount 316, 326, respectively, for anchoring each servo 310, 320 to an inner surface of the body 104 of airframe 102, thereby restricting relative movement between servos 310, 320 and airframe 102. Additionally, each servo 310, 320 of thrust vectoring assembly 250 may be powered by and electrically connected to the power supply 140 of aircraft 100. As will be described further herein, each servo 310, 320 may be independently controlled by the control system 350 of aircraft to selectably control the attitude and trajectory of aircraft 100 once aircraft enters the hover stage at the deployment location (e.g., deployment location 26 shown in FIG. 1). In some embodiments, aircraft 100 may be controlled by mechanisms other than thrust vectoring assembly 250, such as via a swash-plate for cyclic and/or collective blade-pitch control for one or both rotor assemblies 200A, 200B.

Referring to FIGS. 2, 3, 10, and 11, Control system 350 of aircraft 100 is generally configured to control the operation of the motor assembly 152 and servos 310, 320 of aircraft 100 to control the movement of aircraft 100 once aircraft enters the descent and/or hover stages of the flight-path of aircraft 100. As shown particularly in FIG. 5, control system 350 may generally include a controller or control board 352, a first motor controller 360, and a second motor controller 364.

Controllers 352, 360, and 364 may comprise a singular controller or control board or may comprise a plurality of controllers or control boards that are coupled to one another. Controllers 352, 360, and 364 may comprise one or more flexible printed circuit boards (PCB) and/or one or more rigid PCBs with flexible or rigid connections therebetween. Controllers 352, 360, and 364 may each comprise at least one processor and associated memory. The one or more processors (e.g., microprocessor, central processing unit (CPU), or collection of such processor devices, etc.) of each controller 352, 360, and 364 may execute machine-readable instructions provided on the memory (e.g., non-transitory machine-readable medium) to provide each controller 352, 360, and 364 with all the functionality described herein. Additionally, the memory of each controller 352, 360, and 364 may comprise volatile storage (e.g., random access memory (RAM)), non-volatile storage (e.g., flash storage, read-only memory (ROM), etc.), or combinations of both volatile and non-volatile storage. Data consumed or produced by the machine-readable instructions of each controller 352, 360, and 364 can also be stored on the memory thereof. As noted above, in some embodiments, each controller 352, 360, and 364 may comprise a collection of controllers and/or control boards that are coupled to one another. As a result, in some embodiments, each controller 352, 360, and 364 may comprise a plurality of the processors, memories, etc.

Controllers 352, 360, and 364 may each be powered by and electrically connected to the power supply 140 of aircraft 100. Controllers 352, 360, and 364 may collectively control the motion of aircraft 100 once aircraft 100 has entered the hovering stage at the deployment location. Particularly, aircraft 100 may include a center of mass (COM) 190, a roll axis 192 extending from the COM 190 of aircraft 100, a pitch axis 194 extending from COM 190 orthogonally to the roll axis 192, and a yaw axis 196 extending from COM 190 orthogonally to both the roll axis 192 and pitch axis 194. Controller 352 may be electrically connected or otherwise in signal communication with each servo 310, 320 of thrust vectoring assembly 250 and may control the pitch and roll of aircraft 100 by selectably operating servos 310, 320.

For example, during the hovering stage of the trajectory of aircraft 100, controller 352 may selectably actuate pitch servo 310 to rotate motor assembly 152 (coupled to inner gimbal 270 of thrust vectoring assembly 250) about pitch control axis 274 to vector the thrust produced by rotor assemblies 200A, 200B and thereby induce a pitch moment 193 about the pitch axis 192 of aircraft 100. Similarly, during the hovering stage of the trajectory of aircraft 100, controller 352 may selectably actuate roll servo 320 to rotate motor assembly 152 roll control axis 254 to vector the thrust produced by rotor assemblies 200A, 200B and thereby induce a roll moment 195 about the roll axis 194 of aircraft 100. Further, controller 352, acting through motor controllers 360, 364, may independently vary the rotational rate or revolutions per minute (RPM) of each motor 154, 156 of motor assembly 152 such that the RPM of first motor 154 differs from the RPM of second motor 156. Given that rotor assemblies 200A, 200B counter-rotate, a yaw moment 197 may be induced about the yaw axis 196 of aircraft 100 in response to the creation of a differential RPM between motors 154, 156.

Figure 12:
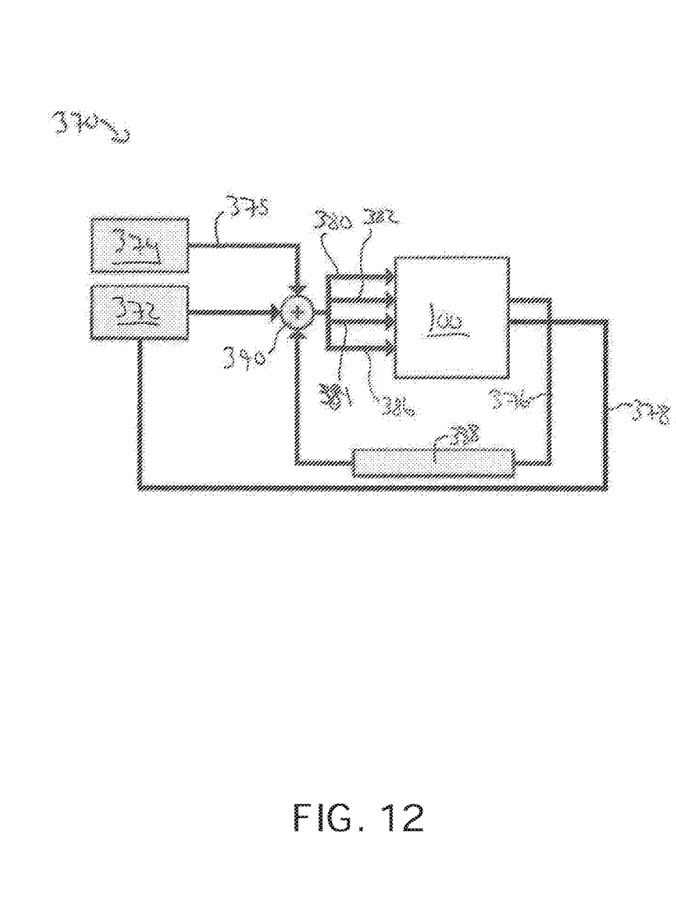
FIG. 12 is a flowchart of an embodiment of a feedback control mechanism of the aircraft of FIGS. 2, 3 according to some embodiments.

Referring to FIGS. 2, 3, and 10-12, a flowchart illustrating a closed-loop feedback control mechanism 370 implemented by control system 350 is shown in FIG. 12. In some embodiments, control system 350 may include an autopilot, an electronic wireless transmitter and corresponding receiver for receiving inputs 372 from a pilot of aircraft 100, a ground station 374 positioned distal aircraft 100 (e.g., at the launch location 24 shown in FIG. 1), and a telemetry module. Aircraft 100 may be equipped with a custom autopilot along with a telemetry module for stability and to transmit data during flight to ground station 374. The autopilot of control system 350 may utilize a tri-axial accelerometer and a gyroscope to determine the attitude of aircraft 100, and further, closed-loop feedback control mechanism 370 and pilot inputs 372 (received via the receiver of aircraft 100) to stabilize and control the hovering fight of aircraft 100 at the deployment location (e.g., deployment location 26 shown in FIG. 1). Particularly, the attitude of aircraft 100 may be obtained from the measured body-axis angular rates (gyroscope) and the tilt of the gravity vector (accelerometer). These measurements may be filtered and fused to determine the pitch and roll attitude of aircraft 100 during hovering flight. In some embodiments, measurements of the states of aircraft 100 and control inputs (e.g., pilot inputs 372, etc.) are transmitted from aircraft 100 to the ground station 374.

As shown particularly in FIG. 12, an onboard inner loop feedback 376 of feedback control mechanism 370 corresponding to the body states (e.g., body states p, q, r, $\varphi$, and $\theta$) of aircraft 100 is provided by controller 352 of control system 350 while an outer loop feedback 378 corresponding to the inertial states (e.g., inertial states x, y, z) of aircraft 100 is provided by the pilot of aircraft 100 via a controls interface as pilot inputs 372. In some embodiments, the outer loop feedback 378 provided by the pilot may include heave, roll, pitch, and yaw of aircraft 100.

In some embodiments, electronic control mixing provided by controller 352 provides a plurality of control signals (e.g., pulse width modulated (PWM) signals) for controlling components of aircraft 100. Particularly, a first control signal 380 may be provided to the first motor controller 360 for controlling the RPM of first motor 154, and a second control signal 382 may be provided to the second motor controller 364 for controlling the RPM of second motor 156. In addition, a third control signal 384 may be provided to the pitch servo 310 of thrust vectoring assembly 250 for controlling a command position of pitch servo 310, and a fourth control signal 386 may be provided to the roll servo 320 of thrust vectoring assembly 250 for controlling a command position of roll servo 320.

In some embodiments, control signals 380-386 are processed by a proportional-derivative (PD) controller 388 of feedback control mechanism 370. Particularly, attitude measurements of aircraft 100 (obtained via the accelerometer and gyroscope of aircraft 100) may be fed to PD controller 388 to stabilize the pitch and roll of aircraft 100. Yaw of aircraft 100 may be stabilized using a derivative feedback controller. Following processing by PD controller 388, inner loop feedback 376 is provided to a junction 390 which receives pilot inputs 372 and gains and trims 375 from ground station 374. Particularly, the pilot or other operator of aircraft 100 may update feedback gains, change trim points, and record telemetry data from the autopilot of controller 352 via ground station 374.

In other embodiments, the features of feedback control mechanism 370 of control system 350 may vary. For example, in some embodiments, aircraft 100 may fly autonomously during the hovering stage without input from a pilot, eliminating the outer loop feedback 378 provided by pilot controls 372 and/or ground station 374. Additionally, in some embodiments, a controller other than PD controller 388 may be used, such as a proportional-integral-derivative (PID) controller or other model-based controllers.

In some embodiments, aircraft 100 may include additional sensors and other equipment for performing one or more functions (e.g., ISR, etc.) as aircraft 100 loiters at the deployment location. In some embodiments, sensor data may be transmitted to the pilot or other operator of aircraft 100 via ground station 374, thereby permitting the operator of aircraft 100 to obtain data pertaining to the deployment location.

The configuration of rotary-wing aircraft which may be utilized in projectile-launched aircraft systems (e.g., system 10) may vary from the configuration of aircraft 100 shown in FIGS. 2-12. For example, referring to FIG. 13, another embodiment of an unmanned hover-capable, rotary-wing aircraft 400 is shown. Aircraft 400 may include features in common with aircraft 100, such as the configuration of control system 350. However, unlike aircraft 100 which includes a thrust vectoring assembly 250 having nested outer and inner gimbals 252, 270, respectively, aircraft 400 may include two separate and distinct gimbals and rotor assemblies positioned at opposite longitudinal ends of aircraft 400.

Figure 13:
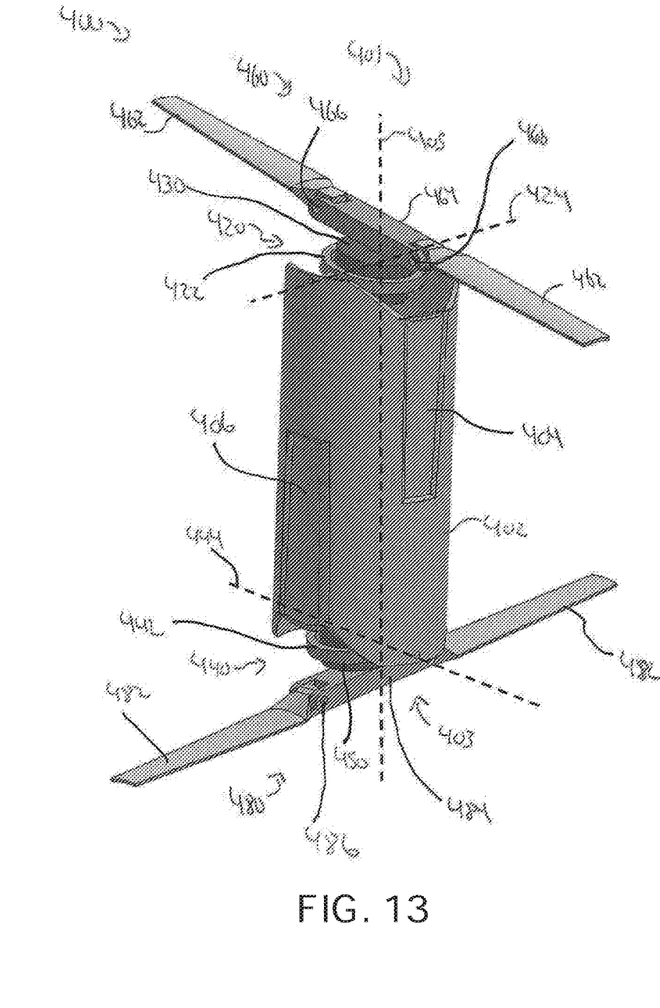
FIGS. 13, 14 are perspective views of other rotary-wing, hover-capable aircraft of the system of FIG. 1 according to some embodiments.

Particularly, aircraft 400 has a first longitudinal end 401, a second longitudinal end 403 opposite the first longitudinal end 401, a central or longitudinal axis 405, and may generally include an airframe 402, a first thrust vectoring assembly 420, a second thrust vectoring assembly 440, a first rotor assembly 460, and a second rotor assembly 480. First thrust vectoring assembly 420 may include a single gimbal 422 pivotable about a first pivot axis 424 extending orthogonal the central axis 405 of aircraft 400. A first motor 430 of aircraft 400 may be positioned within the first gimbal 424 for rotating the first rotor assembly 460, the first motor 430 and first rotor assembly 460 each being rotatable about the first pivot axis 424 relative to the airframe 402. First rotor assembly 460 is positioned at the first longitudinal end 401 of aircraft 400 and includes a pair of rotor blades 462 and a rotor hub 464 located centrally with respect to rotor blades 462. A radially inner end or root of each rotor blade 462 may be pivotably connected to rotor hub 464 via a pivot joint 466.

The second thrust vectoring assembly 440 of aircraft 400 may include a single gimbal 442 pivotable about a second pivot axis 444 extending orthogonal the central axis 405 of aircraft 400. Additionally, second pivot axis 444 may extend orthogonal to the first pivot axis 424 of first thrust vectoring assembly 420. A second motor 450 of aircraft 400 may be positioned within the second gimbal 444 for rotating the second rotor assembly 480, the second motor 450 and second rotor assembly 480 each being rotatable about the second pivot axis 444 relative to the airframe 402. Second rotor assembly 480 is positioned at the second longitudinal end 403 of aircraft 400 and includes a pair of rotor blades 482 and a rotor hub 484 located centrally with respect to rotor blades 482. A radially inner end or root of each rotor blade 482 may be pivotably connected to rotor hub 484 via a pivot joint 486.

Second rotor assembly 480 may counter-rotate relative first rotor assembly 460 but may, when oriented as shown in FIG. 13, produce a singular thrust vector. Additionally, airframe 402 of aircraft 400 may include a first pair of recesses 404 for receiving the rotor blades 462 of first rotor assembly 460, and a second pair of recesses 406 for receiving the rotor blades 482 of second rotor assembly 480 when each rotor assembly is in a stowed configuration.

Figure 14:
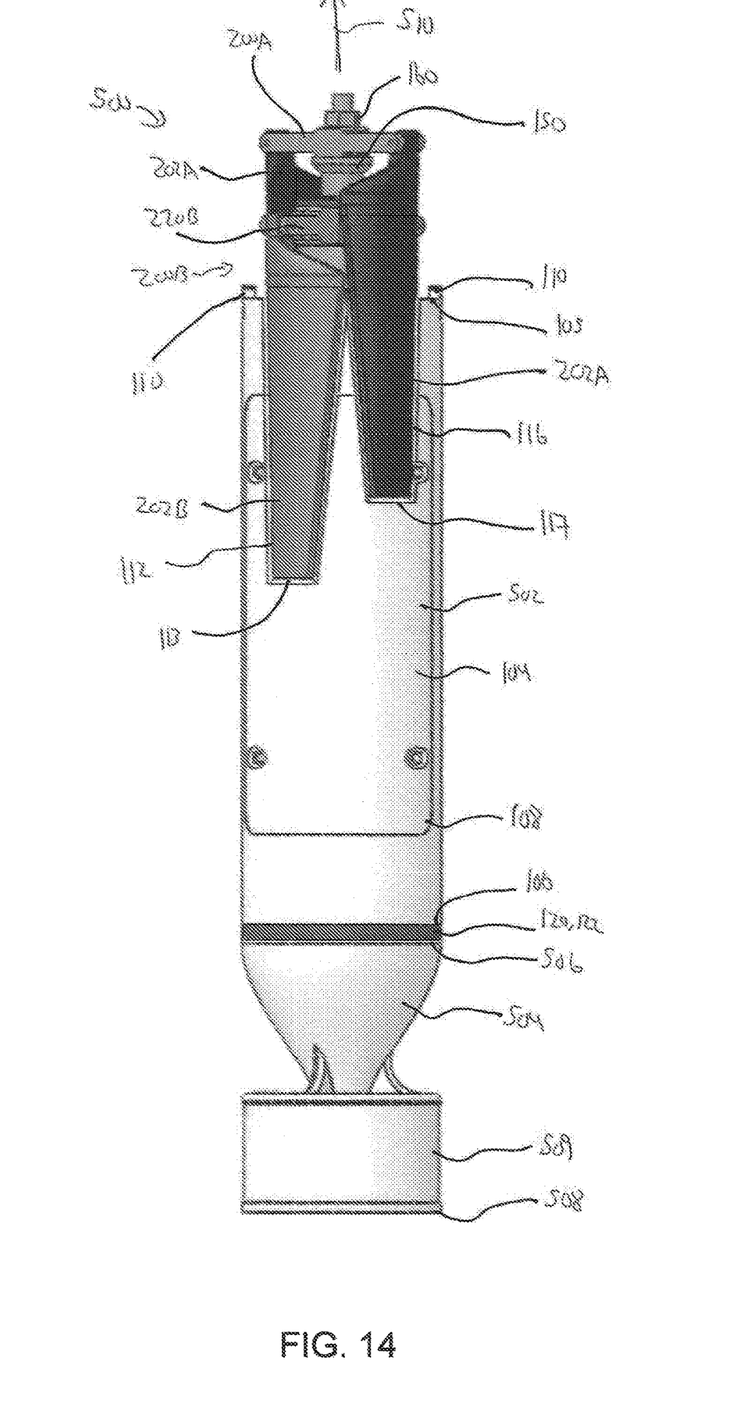

Referring to FIG. 14, another embodiment of an unmanned hover-capable, rotary-wing aircraft 500 is shown. Aircraft 500 may include features in common with aircraft 100, and shared features are labeled similarly. Particularly, aircraft 500 is similar in configuration except that, instead of nose 130, the airframe 502 of aircraft 500 comprises a tail 504 that includes a longitudinal first end 506, a longitudinal second end 508 opposite the first end 506, and a fin or stabilizer 509 proximal second end 508 for stabilizing the flight of aircraft 500 following the launch of aircraft 500 from a projectile launcher (e.g., projectile launcher 12 shown in FIG. 1). In some embodiments, aircraft 500 may be configured to be launched along a vertical flightpath (indicated by arrow 510 in FIG. 14) from the projectile launcher. Particularly, within a launch tube of the projectile launcher, the tail 504 of aircraft 500 may be positioned adjacent a cartridge (e.g., cartridge 16 of FIG. 1) of the projectile launcher. Thus, unlike the loading of aircraft 100 described above, rotor assemblies 200A, 200B of aircraft 500 may be positioned opposite the cartridge of the projectile launcher when aircraft 500 is loaded into the projectile launcher prior to being launched along the vertical flightpath 510.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A projectile-launched aircraft system, comprising:
a projectile launcher comprising a triggering mechanism;
a rotary-wing, hover-capable aircraft having a first end and a second end longitudinally opposite the first end, wherein the aircraft comprises:
an airframe;
a rotor assembly located at the first end and that comprises at least one rotor blade, wherein the rotor blade comprises a stowed configuration and a deployed configuration that is circumferentially spaced from the stowed configuration about a pivot axis;
a motor assembly coupled to the rotor assembly and configured to rotate the at least one rotor blade; and
a thrust vectoring assembly comprising an annular gimbal assembly having a receptacle that receives the motor assembly whereby the motor assembly is permitted to pivot relative to the airframe about a pair of orthogonal axes;
a cover having one or more exterior fins and, wherein the cover is coupled to the aircraft at the first end thereof when the aircraft is in the stowed configuration and separated from the aircraft when the aircraft is in the deployed configuration;
wherein, upon actuation of the triggering mechanism, the projectile launcher is configured to launch the aircraft, with the second end of the aircraft located upstream from the first end, along a flightpath.

2. The system of claim 1, wherein the projectile launcher comprises a barrel configured to receive the aircraft and a cartridge comprising a propellant, and wherein the triggering mechanism is configured to initiate the propellant to launch the aircraft from the barrel.

3. The system of claim 1, wherein the flightpath comprises at least one of a vertical flightpath and a ballistic flightpath.

4. The system of claim 1, wherein the aircraft comprises a control system configured to operate the motor to hover the aircraft at a deployment location that is spaced from the projectile launcher.

5. The system of claim 1, wherein the aircraft comprises:
an outer surface defined by the airframe and comprising at least one first recess formed therein;
wherein the first rotor blade is at least partially received in the first recess of the airframe when in the stowed configuration.

6. The system of claim 5, wherein the aircraft comprises:
at least one second rotor blade that is spaced along a longitudinal axis of the aircraft from the first rotor blade;
wherein the outer surface of the airframe comprises at least one second recess formed therein; and
wherein the second rotor blade comprises a stowed configuration and a deployed configuration that is circumferentially spaced from the stowed configuration about a second pivot axis, and wherein the second rotor blade is at least partially received in the second recess of the airframe when in the stowed configuration.

7. The system of claim 6, wherein the gimbal assembly comprises a first gimbal pivotably coupled to the airframe whereby the first gimbal is permitted to pivot relative to the airframe about a first axis of the pair of orthogonal axes, wherein the first rotor blade is coupled to the first gimbal and is permitted to pivot about the first axis relative to the airframe.

8. The system of claim 7, wherein: the annular gimbal assembly comprises a second gimbal pivotably coupled to the airframe whereby the second gimbal is permitted to pivot relative to the airframe about a second axis of the pair of orthogonal axes;
at least one of the first rotor assembly and the second rotor blade is coupled to the second gimbal and is permitted to pivot about the second axis relative to the airframe.

9. The system of claim 8, wherein the aircraft comprises:
a first servo configured to adjust a position of the first gimbal about the first axis;
a second servo configured to adjust a position of the second gimbal about the second axis; and
a control system configured to operate the first servo to control a pitch of the aircraft, operate the second servo to control a roll of the aircraft, and to operate the motor assembly to control a yaw of the aircraft.

10. A rotary-wing, hover-capable aircraft, comprising:
an airframe comprising an outer surface that comprises at least one first recess formed therein;
a first rotor assembly rotatably coupled to the airframe and comprising at least one first rotor blade;
a motor assembly coupled to the first rotor assembly and configured to rotate the at least one first rotor blade; an
a thrust vectoring assembly comprising an annular gimbal assembly having a receptacle that receives the motor assembly whereby the motor assembly is permitted to pivot relative to the airframe about a pair of orthogonal axes;
wherein the first rotor blade comprises a stowed configuration and a deployed configuration that is circumferentially spaced from the stowed configuration about a first pivot axis, and wherein the first rotor blade is at least partially received in the first recess of the airframe when in the stowed configuration.

11. The aircraft of claim 10, further comprising:
a second rotor assembly rotatably coupled to the airframe and comprising at least one second rotor blade, wherein the second rotor assembly is spaced along a longitudinal axis of the aircraft from the first rotor assembly;
wherein the outer surface of the airframe comprises at least one second recess formed therein; and
wherein the second rotor blade comprises a stowed configuration and a deployed configuration that is circumferentially spaced from the stowed configuration about a second pivot axis, and wherein the second rotor blade is at least partially received in the second recess of the airframe when in the stowed configuration.

12. The aircraft of claim 11, wherein the motor assembly comprises a first motor configured to rotate the first rotor blade in a first rotational direction, and a second motor configured to rotate the second rotor blade in a second rotational direction opposite the first rotational direction.

13. The aircraft of claim 11, wherein the annular gimbal assembly comprises a first gimbal pivotably coupled to the airframe whereby the first gimbal is permitted to pivot relative to the airframe about a first axis, wherein the first rotor assembly is coupled to the first gimbal and is permitted to pivot about the first axis relative to the airframe.

14. The aircraft of claim 13, wherein:
the annular gimbal assembly comprises a second gimbal pivotably coupled to the airframe whereby the second gimbal is permitted to pivot relative to the airframe about a second axis that extends orthogonally to the first axis; and at least one of the first rotor assembly and the second rotor assembly is coupled to the second gimbal and is permitted to pivot about the second axis relative to the airframe.

15. The aircraft of claim 14, wherein the second gimbal is positioned radially within the first gimbal and is configured to pivot about both the first axis and the second axis relative to the airframe, and wherein the first rotor assembly is coupled to the second gimbal.

16. The aircraft of claim 14, further comprising:
a first servo configured to adjust a position of the first gimbal about the first axis;
a second servo configured to adjust a position of the second gimbal about the second axis; and
a control system configured to operate the first servo to control a pitch of the aircraft, operate the second servo to control a roll of the aircraft, and to operate the motor assembly to control a yaw of the aircraft.

17. The aircraft of claim 10, wherein the aircraft comprises a first rotor assembly that comprises a plurality of circumferentially spaced first rotor blades and a rotor hub centrally positioned between the plurality of first rotor blades, and wherein a radially inner end of each first rotor blade couples to the rotor hub at one of a plurality of hinges.

18. A method for directing a rotary-wing, hover-capable aircraft along a flightpath, comprising:
(a) launching the aircraft from a projectile launcher positioned at a launch location such that a rotor assembly of the aircraft is located at a downstream end thereof as the aircraft is launched from the projectile launcher;
(b) actuating a rotor blade of the rotor assembly of the aircraft from a stowed configuration to a deployed configuration that is circumferentially spaced from the stowed configuration about a pivot axis;
(c) activating a motor assembly coupled to the rotor assembly to rotate the rotor blade;
(d) activating a thrust vectoring assembly comprising an annular gimbal assembly having a receptacle that receives the motor assembly to pivot the motor assembly relative to an airframe of the aircraft about a pair of orthogonal axes; and
(e) hovering the aircraft at a deployment location that is spaced from the launch location.

19. The method of claim 18, wherein the first rotor blade is received in a recess formed in an outer surface of the airframe of the aircraft when the first rotor blade is in the stowed configuration.

* * * * *